United States Patent [19]

Kohler et al.

[11] Patent Number: 5,082,577
[45] Date of Patent: Jan. 21, 1992

[54] METHOD AND COMPOSITION FOR SELECTIVELY REDUCING PERMEABILITY TO WATER IN HYDROCARBON RESERVOIRS WHICH ARE HOT AND SALINE

[75] Inventors: Norbert Kohler, Villennes sur Seine; Alain Zaitoun, Rouen, both of France

[73] Assignee: Institut Francais du Petrole, Rueil Malmaison, France

[21] Appl. No.: 630,579

[22] Filed: Dec. 20, 1990

[30] Foreign Application Priority Data

Dec. 21, 1989 [FR] France .................... 89 17161

[51] Int. Cl.$^5$ .............................. E21B 43/22
[52] U.S. Cl. .................... 252/8.551; 252/8.552; 252/8.554; 166/268; 166/271; 166/274; 166/272; 166/295; 166/300; 523/130
[58] Field of Search .............. 252/8.551, 8.552, 8.554; 166/268, 271, 274, 272, 295, 300; 523/130

[56] References Cited

U.S. PATENT DOCUMENTS

| | | | |
|---|---|---|---|
| 3,898,165 | 8/1975 | Ely et al. | 252/8.551 |
| 4,009,755 | 3/1977 | Sandiford | 166/270 |
| 4,088,584 | 5/1978 | Smalley et al. | 252/8.554 |
| 4,098,337 | 7/1978 | Argabright et al. | 166/270 |
| 4,256,590 | 3/1981 | Naslund et al. | 252/8.554 |
| 4,647,312 | 3/1987 | Sampath | 252/8.551 X |
| 4,718,491 | 1/1988 | Kholer et al. | 166/294 |
| 4,838,352 | 6/1989 | Oberste-Padtberg et al. | 166/300 |
| 4,851,143 | 7/1989 | Shu | 252/8.554 |
| 4,899,818 | 2/1990 | Jennings, Jr. et al. | 270/4,901,795 |
| 4,901,795 | 2/1990 | Phelps et al. | 166/270 |
| 4,903,766 | 2/1990 | Shu | 166/270 |
| 4,928,766 | 5/1990 | Hoskin | 166/270 |

Primary Examiner—Robert L. Stoll
Assistant Examiner—Chhaya Sayala
Attorney, Agent, or Firm—Millen, White & Zelano

[57] ABSTRACT

For selectively reducing permeability to water in an underground formation producing oil and/or gas, injecting into the formation a composition comprising water, at least one water soluble aldehyde compound at a concentration (by weight) of 180 to 20,000 ppm and at least one non-ionic polysaccharide at a concentration (by weight) of 200 to 5000 ppm, the concentration of aldehyde compound being higher than that of polysaccharide. The composition may be used in the water injection well or the hydrocarbon producing well and may assist in the recovery of hydrocarbons.

27 Claims, 1 Drawing Sheet

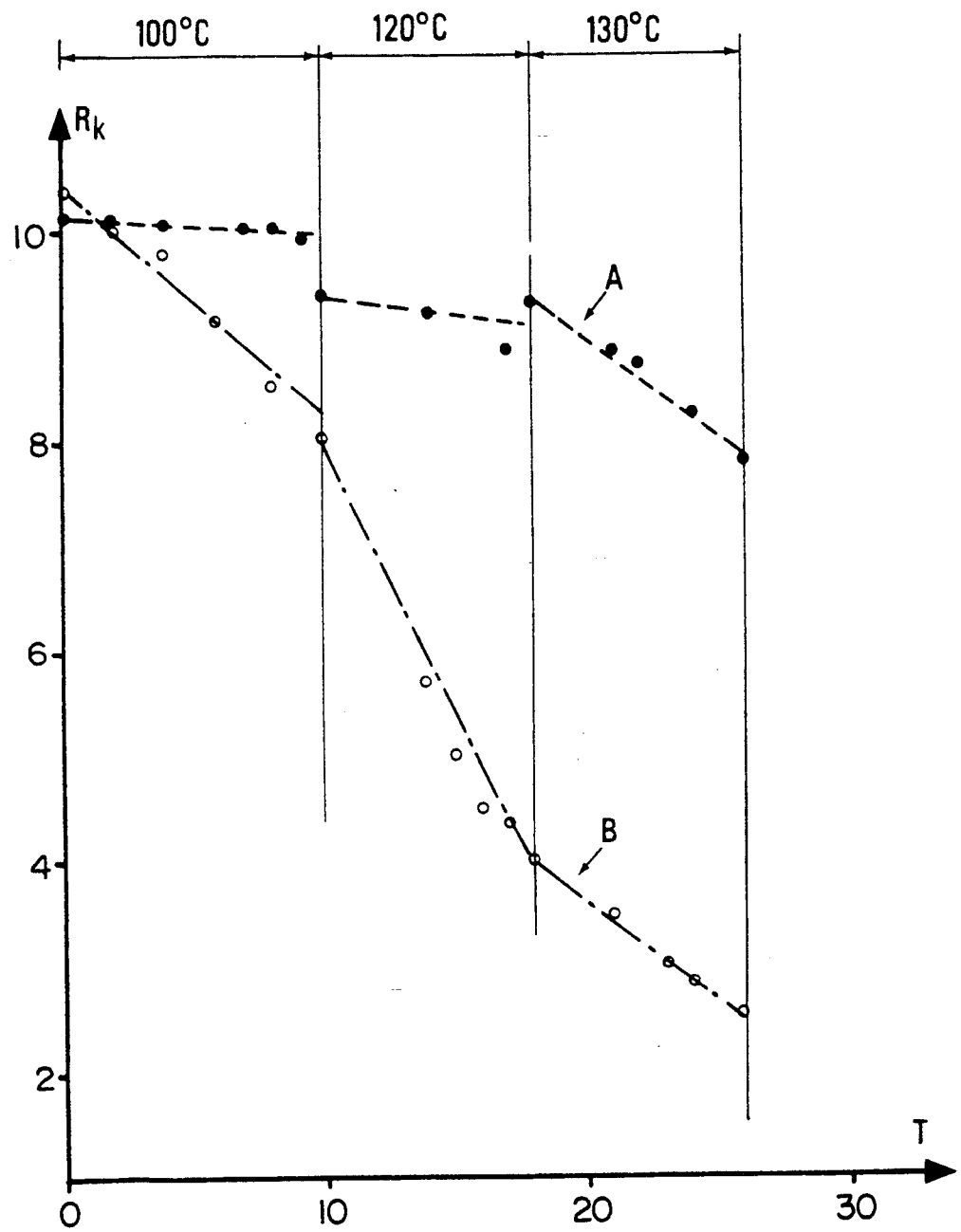

METHOD AND COMPOSITION FOR SELECTIVELY REDUCING PERMEABILITY TO WATER IN HYDROCARBON RESERVOIRS WHICH ARE HOT AND SALINE

BACKGROUND OF THE INVENTION

The invention relates to a method and composition for selectively reducing the permeability to water of hydrocarbon reservoirs which are hot and saline. It selectively reduces circulation of water in underground formations without thereby reducing the passage of oil or gas. The invention is of particular interest when the water is hot and/or saline, for example at a formation temperature of 70° to 130° C. and/or a water salinity at least as great as that of sea water. It is particularly applicable to assisted recovery of hydrocarbons.

The recovery of liquid and gaseous hydrocarbons from underground formations is very often accomplished by the production of large quantities of water. In some cases, although significant hydrocarbon production is obtained, so much water is produced and the cost of treating it is so high that hydrocarbon production becomes uneconomic. More specifically, the massive inflow of water increases both the costs of production, for example by gas lift, and the costs of separating the fluids for treating the water and discharging it. It also prevents the hydrocarbon from flowing to the well and aggravates problems of sediment formation and corrosion. In heterogeneous reservoirs, excessive water production is often caused by digitation of the water injected through the zones of high permeability. This leads to a premature breakthrough of water into the production well, to bad volumetric scavenging and finally to inefficient hydrocarbon recovery.

Many methods of reducing the permeability to water of very permeable formations have been proposed and tested in situ; they generally consist of putting either a cement or a suspension of solid particles or paraffins into the formation, at the level of the zone to be insulated. Resins or gels of water soluble polymers have more recently been proposed and used. All these methods have the drawback of not being selective and of blocking the circulation of oil or gas almost as much as that of water.

The use of water soluble polymers of high molecular weight in the absence of any cross-linking or curing agent has been proposed more recently. Compared with previous solutions and particularly those using resins or polymer gels, these polymers have the advantage of reducing water circulation without adversely affecting oil or gas production.

Two families of water soluble polymers of high molecular weight have been used in particular; hydrolyzed or non-hydrolyzed polyacrylamides and some polysaccharides, particularly non-ionic polysaccharides.

Thus, U.S. Pat. No. 4,095,651 recommends using hydrolyzed polyacrylamides of high molecular weight dispersed in a water more saline than that of the formation, as a means of selectively combatting the irruption of water from the producing wells. However, this method is of limited usefulness since it is effective chiefly in reducing irruption of water of low salinity ($\leq 5$ g/l of total salts dissolved) and because hydrolysis of the polyacrylamide to polyacrylate reduces its effectiveness as soon as the temperature rises above 60°–70° C.

U.S. Pat. No. 4,842,071 recommends simultaneous or consecutive injection of a non-ionic polymer or copolymer of acrylamide and of a basic agent as a means of selectively reducing irruption of water into producing wells. Although this method is effective in reducing the irruption of very salt water, it has the same disadvantages as those based on hydrolyzed polyacrylamides as soon as there is a high temperature at the bottom.

U.S. Pat. No. 4,155,405 recommends injecting a non-hydrolyzed aqueous polyacrylamide gel and a dialdehyde into wells which have already been sunk or are in the process of being sunk, in order to prevent water from irrupting. Apart from the fact that the stability of the basic polymer is reduced when the temperature of the reservoir rises, the gel which is formed in situ is not selective and therefore blocks both the water and the oil or gas.

U.S. Pat. No. 4,133,383 describes a process for definitively blocking fluid flow in a formation at the level of a well with non-controlled production, in which a non-viscous fluid in an acid medium is injected at low temperature through a secondary reservoir. The non-viscous fluid comprises a polysaccharide cross-linked by a dialdehyde, which is converted by the effect of temperature to a highly viscous fluid in the formation and in the vicinity of the non-controlled well. The serious disadvantage of this type of process is that it definitively stops any production of fluids at the level of the production well.

Assignee's U.S. Pat. No. 4,718,491 recommends using various polysaccharides and particularly a scleroglucan, in the absence of any stabilizing additive for selective reduction of permeability to water in the vicinity of an oil or gas producing well. The preferred field of application for the process is in the production of hot water (up to 130° C.) and salt water (salinity over 30 g/l).

However, it is found that the polymer does not remain stable very long in a porous medium, particularly at high temperature. Thus at about 75° C., in the presence of salt water, the polymer has been found to have satisfactory stability for a period of a year, whereas at about 120° C. one cannot generally hope to stabilize the polymer longer than a week without any additives.

SUMMARY OF THE INVENTION

The invention overcomes the above-mentioned disadvantages and thus concerns a method of treatment in which the stability of the polysaccharide injected is substantially improved and the effect of the treatment lasts longer, without any substantial change in the viscosity of the polymer solution injected. More specifically, the invention concerns a method of selectively reducing permeability to water in an underground formation producing oil and/or gas, wherein an aqueous composition containing a solution of at least one non-ionic polysaccharide is injected through an injecting well or a producing well into the formation surrounding the water injecting well or the hydrocarbon producing well, at a concentration (by weight) of 180 to 5000 parts per million (ppm) of solution at an appropriate flow rate and/or pressure, characterized in that the composition comprises at least one aldehyde compound at a concentration (by weight) of 200 to 20000 parts of pure compound per million parts of solution, the aldehyde compound being at a higher concentration than the polysaccharide, and that, if the aqueous composition is injected into the producing well, that well is put back into production or if it is injected into the water injecting well, then water is injected into that well.

"Reduction of permeability ($R_k$) to a given fluid" is understood as being the ratio of the initial permeability ($k_i$) to the final permeability ($k_f$) measured under the same conditions of flow rate and hence of shear rate and temperature.

The mixture of non-ionic polysaccharide and aldehyde compound is preferably injected into the injection or production well at a flow rate and/or pressure high enough to allow for easy introduction into the underground formation, but at a pressure below the maximum permissible stratum pressure or formation fracturing pressure.

"A high enough flow rate and/or pressure" is understood as being a flow rate and/or pressure corresponding to a shear rate of at least 50 $s^{-1}$. The viscosity of the polysaccharide/aldehyde compound mixture at that shear rate is preferably below 10 mPa.s, for example from 1 to 9 mPa.s (1 mPa.s = 1 cP).

A reduction of at least 50% in the viscosity measured at a shear rate of 1 $s^{-1}$ is typically preferred. The shear rate is defined as $$\delta = \frac{4v}{r} \text{ where } v = \frac{q}{S\phi}$$

v: linear displacement velocity in centimeters/second on entering the formation
q: flow rate in $cm^3/s$
S = area of entry into formation
r = $(8k/\phi)^{\frac{1}{2}}$ = average pore radius expressed in centimeters
k = permeability of formation in $cm^2$ (1 $cm^2$ = $10^8$ darcys)
$\phi$ = porosity.
Note: the units are CGS.

The composition is preferably introduced into the formation in a slightly basic medium, for example at a pH from 7.1 to 10 and a more particularly from 7.1 to 8.5.

The method of the invention is carried out as follows:

In an operation described as secondary recovery, water is injected into an injection well and oil is recovered from a production well. If the water injected into the injection well arrives in the production well prematurely, owing to the existence of highly permeable channels or drains, injection of water into the injection well is stopped, the composition according to the invention is injected into said injection well and the permeability to water of the channels or drains in the underground formation is changed, resulting in regularization of the water injecting face. Water is then reintroduced into the formation through the injection well under flow rate conditions generally identical with those under which the initial water was injected, to make the scavenging face advance homogeneously, and the oil produced is recovered.

The composition according to the invention may be used selectively to reduce permeability to water in a production well without affecting permeability to hydrocarbons. When it is found that more water than oil is being produced, essentially through the zones of higher permeability, pumping in the production well is stopped and the composition according to the invention is injected into said well. After a volume corresponding to a radial extension of the composition by 1 to 30 meters from the well has been injected, and possibly after the well has been closed for a few days to facilitate adsorption of the polymer, the well is put back into production; it produces less water through the zone of high permeability but more oil or gas through the zone of low permeability. The well is generally put back into production gradually and as far as possible at a flow rate and/or pressure no higher than that used to inject the aqueous composition.

Of the polysaccharides which satisfy the criteria of the invention it is preferable to use non-ionic polysaccharides such as glucanes and particularly scleroglucan and schizophyllan, galactomannan gums such as guar gum and particularly its derivatives by substitution, such as hydroxylpropyl guar and carboxymethyl guar.

The not inconsiderable advantages of using these polysaccharides in accordance with this process, as compared with polyacrylamides and their copolymers, are that they are less sensitive to mechanical degradation and shearing, as encountered by aqueous solutions of these polymers essentially in the area surrounding the well and on entering the formation; that they have better compatibility and higher viscosity increasing capacity in the presence of salt water; and the fact that heat does not make them undergo a hydrolysis reaction, which affects the stability of polyacrylamides as soon as the temperature rises above 60° to 70° C.

Another advantage over Applicants' U.S. Pat. No. 4,718,491 is that the composition is far more stable, particularly in the temperature range above 95° C. This makes is possible to economize in products injected into the oil field and to maintain the intrinsic properties, particularly the viscosity, of the non-ionic polysaccharide for longer periods.

Of the non-ionic polysaccharides according to the invention scleroglucan is found to be the most active. The concentration of polymer in aqueous solution is bound up firstly with the viscosity which is developed, and secondly with its effect on permeability to water. Suitable concentrations are most frequently from 180 to 5000 ppm by weight of polymer relative to the solution, preferably from 480 to 3000 ppm and more particularly from 700 to 2500 ppm.

The term "aldehyde compound which is mixed with the aqueous solution of non-ionic polysaccharide" refers to a monoaldehyde, dialdehyde or polyaldehyde or any combination of these, whether or not they are substituted, as chloral is for example. The aldehydes may be aromatic, saturated or unsaturated. They are preferably saturated and are generally soluble in the aqueous solution.

Of the aldehyde compounds according to the invention, formaldehyde and dialdehydes of the general formula OHC(R)$_n$CHO in which n = 0 to 6, preferably 0 to 3 and R is a divalent hydrocarbon radical with 1 to 4 carbon atoms, such as glyoxal or glutaraldehyde, are preferable for economic reasons.

The concentration of aldehyde compound to be included in the non-ionic polysaccharide solutions according to the invention is from 200 to 20000 ppm of pure aldehyde compound in the solution, advantageously from 500 to 1500 ppm, preferably from 1000 to 12000 ppm and more particularly from 3000 to 10000 ppm. Moreover the concentration of aldehyde compound depends on the concentration of non-ionic polysaccharide in the aqueous solution and on the temperature of the underground formation corresponding to the application envisaged. The highest temperatures of the underground formation will call for a higher concentration of aldehyde. At 120° C., for example, it will be preferable to have a concentration of at least 1000 pm, whereas at 70° C. a concentration of 200 ppm may generally be sufficient.

The best results are obtained when the concentration of aldehyde compound is higher than that of polymer.

The target temperature range for using the mixture of a non-ionic polysaccharide and an aldehyde compound is from ambient to 130° C. As already emphasized above, temperatures of 70° to 130° C. and more particularly temperatures from 100° to 130° C. are important for a special application in very salt water. At these temperatures the addition of an aldehyde compound has nothing to do with the bactericidal action which characterizes some of them, particularly formaldehyde. It is realized that polysaccharides generally undergo harmful effects from bacteria which are present in their solutions or emanate from the deposit, but that the effects become less harmful when the temperature rises and virtually negligible as soon as it is over 70° C.

It should be noted that it has not been possible to provide evidence of a gelling reaction between the non-ionic polysaccharides according to the invention and the aldehyde compounds. This is in contrast with other formulations used to reduce the permeability of underground formations to water, based on the formation of a gel between a water soluble polymer and an aldehyde compound which is not selective, such as the systems based on cationic or non-ionic polyacrylamides described respectively in U.S. Pat. Nos. 4,782,900 and 4,155,405 already mentioned or those based on polyvinyl alcohol and an aldehyde compound described in U.S. Pat. Nos. 4,498,540 and 4,664,194. More particularly, the addition of an aldehyde compound to a non-ionic polysaccharide solution has been shown not to change the viscosity of the said polymers within the limits of the concentrations used in the invention, regardless of the water salinity levels and temperatures investigated.

It should also be noted that, although the mechanisms involved are not yet fully understood, a particularly advantageous condition to make a non-ionic polysaccharide satisfy the criteria of the invention is that it should at least briefly retain its viscosity within the salinity and temperature range investigated. This applies, for example, to non-ionic polysaccharides such as scleroglucan and schizophyllan, with a triple propeller structure which is theoretically stable to 130° C., as described in the report by B. Rivenq, A. Donche and C. Noik to the Socété des Ingénieurs Pétroliers (Petroleum Engineers Association) in October 1989 under reference SPE 19.635. This stability in time is unexpectedly enhanced by the aldehyde compound.

The invention fully concerns a composition particularly for selectively reducing permeability to water in underground formations, particularly formations which are warm and contain salt water. The composition generally contains:
from 0.018% to 0.5% by weight of at least one non-ionic polysaccharide
from 0.02% to 2% by weight of at least one water soluble aldehyde compound and
from 97.5% to 99.962% of water
It advantageously contains:
from 0.048% to 0.3% and preferably from 0.07 to 0.25% of at least one non-ionic polysaccharide
from 0.05% to 1.5% and preferably from 0.3 to 1% of at least one water soluble aldehyde compound
from 98.2 to 99.902% of water and preferably from 98.75% to 99.63% of water.

BRIEF DESCRIPTION OF DRAWING

The attached drawing is a graph of the reduction of permeability of water as a function of time, temperature and using an additive, and which is further explained in Examples 12 and 13.

The following examples are designed to illustrate the various advantages of using the formulations according to the invention. They include tests on the stability of the aqueous solutions of non-ionic polysaccharide relative to temperature and salt water and tests in circulation in a porous medium under conditions which come as close as possible to those in the oil field.

TEST IN TUBES

Examples 1 to 8

The tests are carried out on crude solutions of polysaccharide powder in the presence or absence of aldehyde compounds at temperatures from 95° to 120° C., either in sea water reconstituted in the laboratory from 30 g/l of NaCl and 3 g/l of $CaCl_2$, $2H_2O$, or in a deposit type water with a total salinity of 124.5 g/l, reconstituted in the laboratory from 116.6 g/l of NaCl, 6.4 g/l of $CaCl_2$, $2H_2O$, 1.1 g/l of $MgCl_2$, $6H_2O$ and 0.4 g/l of KCl.

With a view to limiting acid hydrolysis of the glycoside functions linking the various carbohydrate molecules, an inorganic carrier which is insoluble in water, calcium carbonate, acting as a pH buffer between about 7.5 and 8.5 and also simulating contact with the storage rock, is included in most of the solutions subjected to the thermal stability test. This procedure and the conditions for preparing the various tubes containing the compositions according to the invention are inspired directly by the report by R. S. Seright and H. J. Henrici to the Societe des Ingenieurs Petroliers in April 1986 under reference SPE 14.946.

Examples 1 to 8 each relates to series of sealed tubes containing 1 g/l solutions of commercial scleroglucan in powder form, ACTIGUM PVE produced by SANOFI BIO INDUSTRIES, FRANCE, in the presence of variable concentrations of aldehyde compound and placed in ovens at the temperature indicated in Table 1. One tube in each series is opened at the end of 3, 7, 15, 30, 60 and 100 days respectively after its preparation, and its viscosity is measured against a reference rate arbitrarily selected at 7.3 $s^{-1}$ with an LS viscometer produced by CONTRAVES and compared with the viscosity at time t=0 days.

Table 1 gives the results of the various tests in terms of the number of days required for the viscosity of each series of tubes to reach half the initial viscosity.

TABLE 1

Stability in time of aqueous solutions containing 1000 ppm of ACTIGUM PVE (sealed tubes)

| Example No. | Aldehyde Compound Type | Concentration (g/l) | T = 95° C. Water in deposit | T = 100° C. Sea water | T = 120° C. Sea water |
|---|---|---|---|---|---|
| 1 | — | — | <7 days | <7 days | <7 days |
| 2 | formaldehyde | 2 | <30 days | ≈15 days | <15 days |
| 3 | formaldehyde | 10 | <100 days | <100 days | <100 days |
| 4 | formaldehyde | 30 | <100 days | >100 days | >100 days |
| 5 | Glyoxal | 10 |  | >100 days | <100 days |
| 6 | Glyoxal | 30 |  | >100 days | >100 days |
| 7 | glutaraldehyde | 10 |  | >60 days | <15 days |
| 8 | glutaraldehyde | 30 |  | >100 days | <100 days |

Regardless of the temperature, solutions not containing any aldehyde compound are found to lose their viscosity very rapidly. When aldehyde compound is present on the other hand, temperature stability increases in time according to the concentration of the aldehyde compound.

Examples 9 to 11

Stability in Time of Aqueous Solutions Containing 1000 PPM of Hydroxypropylguar

The previous tests are repeated with sea water solutions containing 1000 ppm of hydroxypropylguar powder, Galactasol 476 produced by Aqualon (France). The pH of all these solutions is kept between 7.5 and 8.5 by adding $CaCO_3$ in powder form.

TABLE 2

| Example No. | Aldehyde Composition Type | Concentration g/l | T = 100° C. | T = 120° C. |
|---|---|---|---|---|
| 9 | — |  | <3 days | <1 day |
| 10 | formaldehyde | 10 | <30 days | <7 days |
| 11 | glyoxal | 10 | <30 days | <7 days |

It will be seen from Table 2 that the addition of an aldehyde compound also lengthens the life of hydroxypropylguar solutions, but that the viscosity stabilizing effect does not last as long as with scleroglucan solutions.

TEST ON REDUCTION OF PERMEABILITY TO WATER IN A POROUS MEDIUM

Examples 12 to 13

Two cores made of Berea sandstone are used, each placed in a Hassler cell, which are in turn placed in an oven at 100° C. By injecting reconstituted sea water (reconstituted from 30 g/l of NaCl and 3 g/l of $CaCl_2,2H_2O$) at about pH 7.5 and measuring the pressure drop at the limits of each core, it is possible to calculate the permeability of the cores by applying Darcy's law:

$$k = \frac{l \mu g}{S \Delta P} \cdot 10^3$$

where k is the permeability of the core expressed in millidarcys (mD)

l is the length of the core expressed in centimeters $\mu$ is the viscosity of the water in mPa.s (1 mPa.s = 1 cP)

q is the water injection rate in $cm^3$ per second $\Delta P$ is the pressure drop at the limits of the core in atmospheres S is the area of the inlet surface of the core in $cm^2$.

The permeability to water of the two cores of Berea sandstone is respectively 143 and 149 mD.

A 1 g/l (1000 ppm) solution of scleroglucan in powder form, ACTIGUM PVE produced by SANOFI BIO INDUSTRIES, FRANCE, in sea water reconstituted from 30 g/l of NaCl and 3 g/l of $CaCl_2,2H_2O$ ($\mu=8.5$ mPa.s at $\gamma=198$ s$^{-1}$, $\mu=350$ mPa.s at $\gamma=1$ s$^{-1}$) is injected into each of the cores at a constant flow rate of 100 $m^3$/h ($\gamma=198$ s$^{-1}$), except that no stabilizing additive is included in the first solution whereas 10 g/l of pure formaldehyde (30 g/l of commercial solution) is included in the second.

The pH of both solutions is about 7.5

When about 15 pore volumes of each of the solutions has been injected the porous medium is rested for 48 hours before permeability to water is measured again. FIG. 1 shows the evolution of the initial permeabilities in terms of reductions in permeability which are directly proportional to the pressure drops measured. For a water injection rate of 100 $cm^3$/hour the permeability reduction values are 10.35 and 10.1 respectively.

Reconstituted sea water is circulated in a closed circuit at the same flow rate of 100 $cm^3$/hour. The pressure losses at the limits of the porous medium are measured daily and the permeability reduction values are calculated. The results are given in FIG. 1, which shows the evolution of the reduction of permeability to water in the course of time expressed in days (curve A with additive, B without).

When the water has circulated at 100° C. for 10 days the temperature of the oven is gradually raised to 120° C. for 8 days, then to 130° C., again for 8 days, and the pressure losses at the limits of each core are again measured daily.

FIG. 1 shows that the permeability reduction values are distinctly more stable in the presence of 10 g/l of formaldehyde according to the invention than in the absence of additive.

Example 14

The previous tests are repeated, this time with 3.3 g/l of pure glyoxal (10 g/l of commercial solution) incorporated in the solution of 1 g/l (1000 ppm) of scleroglucan powder, ACTIGUM PVE provided by SANOFI BIO INDUSTRIES, FRANCE, in sea water (30 g/l of NaCl and 3 g/l of $CaCl_2,2H_2O$). The solution is then injected into a core of Berea sandstone with an initial permeability of 195 mD, at a flow rate of 100 $cm^3$/hour ($\mu=9.2$ mPa.s at a shear rate of 165 s$^{-1}$ whereas $\mu=350$ mPa.s at a shear rate of 1 s$^{-1}$).

The pH of the solution is approximately 7.5.

At a temperature of 120° C. and with reconstituted deposit water (39.932 g/l total salinity) flowing at 100 cm³/hour, the initial permeability reduction value of 4.8 is perfectly stable for 10 days. When the testing temperature is raised to 130° this value decreases gradually to reach a final value of 3.2 at that temperature after 8 days.

Example 15

Example 14 is repeated, but instead of injecting a composition comprising scleroglucan and glyoxal a composition comprising 1 g/l (1000 ppm) of scleroglucan powder and 10 g/l of pure glutaraldehyde (30 g/l of commercial solution) dispersed in reconstituted sea water is injected into a Berea sandstone with an initial permeability to water $k_i$ of 85 mD. The pH of the solution is about 7.5. Perfect stability in the reduction of permeability to deposit water with a total salinity of 39.932 g/l is observed for 8 days at 120° C.

Example 16 (comparative)

The conditions are the same as in Examples 14 and 15, but instead of injecting a composition comprising scleroglucan and glyoxal or glutaraldehyde a composition comprising 2 g/l (2000 ppm) of an anionic polysaccharide, xanthan gum in powder form, RHODOPOL 23 R produced by RHONE-POULENC INDUSTRIES, FRANCE, and 10 g/l of pure formaldehyde (30 g/l of commercial solution), dispersed in reconstituted sea water is injected into a Berea sandstone with an initial permeability to water $k_i$ of 98 mD. After 1 day at 120° C. the reduction in initial permeability $k_i$ to deposit water with a total salinity of 39.932 g/l, which was 1.85, has dropped to 1.05, representing a quasi total absence of polymer stability at that temperature.

TESTS ON REDUCTION OF PERMEABILITY TO WATER IN AN OIL PRODUCING WELL

Examples 17 and 18

With a view to preparing an injection of polymer to reduce irruptions of water from an oil producing well where a high percentage of water is produced, tests are carried out in the laboratory on two cores of deposit with an initial permeability to the water of the deposit, with a total salinity of 124.5 g/l, of 47.5 and 53.8 mD respectively in the presence of residual oil.

A solution of 1 g/l (1000 ppm) of scleroglucan powder in deposit water ($\mu=8.3$ MPa.s at $\gamma=215$ s$^{-1}$, $\mu-500$ MPa.s at $\gamma=1$ s$^{-1}$) is injected into each of the cores at a pH of about 7.5, a temperature of 95° C. and a flow rate of 20 cm³/hour ($\gamma=215$ s$^{-1}$). The solution contains 2 g/l of pure formaldehyde (6 g/l of commercial solution) for the first core ($k_i=47.5$ mD) and no additive for the second core ($k_i$—53.8 mD).

When the injection of polymer in the direction AB of the cores is completed (about 10 pore volumes of solution injected), deposit water is injected in the direction BA at the same flow rate as the polymer injection (20 cm³/hour). When all the free polymer, i.e. the polymer not adsorbed by the porous medium is displaced—a situation easily detected by measuring the viscosity of the effluent—stabilized pressure drop values are obtained at the water at the limits of the two cores. This makes it possible to calculate a final permeability $k_f$ to the deposit water and thus permeability reduction values $R_k$ which are respectively 16 and 14.5 at a flow rate of 20 cm³/hour and at 95° C.

The reduction in permeability for each of the cores kept in an oven at 95° C. is measured at regular intervals for 3 months. At the end of 3 months the permeability reduction values are found to be unchanged for the first core, into which the composition according to the invention was injected, whereas the corresponding values for the second core had dropped by over 90%. At a temperature of 95° C., lower concentrations of aldehyde compound are therefore sufficient to make the scleroglucan perfectly stable and to maintain its properties of reducing permeability to water.

TESTS ON SELECTIVE REDUCTION IN PERMEABILITY TO WATER

Examples 19 and 20

These examples are designed to demonstrate the superiority of the formulations according to the invention containing a polysaccharide and an aldehyde compound over those not containing any, in respect of selective reduction in permeability to water without affecting permeability to oil.

Example 19

A core of Berea sandstone is inserted in a Temco cell equipped with intermediate pressure tappings, the whole arrangement being placed in an oven at 120° C. The length AD of the core is 142 mm and the intermediate pressure tappings are located respectively at B, 25 mm from the inlet of the core and at C, 15 mm from the outlet thereof.

The core is first saturated with sea water reconstituted from 30 g/l of NaCl and 3 g/l of $CaCl_2,2H_2O$ and an initial permeability of 1.55 darcys is measured between B and C.

Neutral oil with a viscosity $\mu$ of 2.8 mPa.s at a temperature of 120° C. is injected, and permeability to oil between B and C is measured and found to be equal to 2 darcys.

Water is injected against and found to be virtually equal to the initial permeability to water, which is 0.58 darcy.

A composition of seawater comprising 1 g/l (1000 ppm) of scleroglucan in powder form, ACTIGUM PVE produced by SANOFI BIO INDUSTRIES, FRANCE ($\mu=340$ mPa.s at $\gamma=1$ s$^{-1}$, $\mu=3.1$ mPa.s at $\gamma=580$ s$^{-1}$) and also 10 g/l of pure formaldehyde (30 g/l of commercial solution) at a pH of about 7.5 is then injected a flow rate of 400 cm³/hour ($\gamma=580$ s$^{-1}$).

By displacing the polymer not adsorbed by the sea water at a flow rate of 100 cm³/hour, one arrives at a new value for permeability to water of 281 mD. The reduction in permeability to water is thus 7.2.

By displacing water by means of oil, permeability to oil is still found to be 2 darcys, so the reduction in permeability to oil is 1.

After immobilizing the core at a temperature of 120° C. for 6 days, 90 days and 150 days respectively, the above-mentioned measurements are taken again. The results are given in Table 3.

TABLE 3

| Stability in time and selectivity of a scleroglucan-formaldehyde composition in a porous medium at 120° C. | | |
|---|---|---|
| Reference | Dwell time at 120° C. | $R_k$ (oil) | $R_k$ (water) |
| no polymer | 0 days | 1.00 | 1.00 |

TABLE 3-continued

Stability in time and selectivity of a scleroglucan-formaldehyde composition in a porous medium at 120° C.

| Reference | Dwell time at 120° C. | $R_k$ (oil) | $R_k$ (water) |
|---|---|---|---|
| Scleroglucan | 0 days | 1.00 | 7.2 |
| 1 g/l | 6 days | 0.98 | 7.2 |
| Pure formaldehyde | 90 days | 0.96 | 7.1 |
| 10 g/l | 150 days | 0.95 | 6.9 |

The formulation according to the invention, positioned in a porous medium at a high temperature, is found to reduce permeability to water efficiently without affecting permeability to oil.

Example 20 (comparative)

The conditions in Example 19 are reproduced, using a different core of Berea sandstone. A 1 g/l (1000 ppm) solution of scleroglucan powder, ACTIGUM PVE produced by SANOFI BIO INDUSTRIES, FRANCE in sea water ($\mu = 340$ mPa.s at $\gamma = 1$ sec$^{-1}$, $\mu - 9.8$ mPa.s at $\gamma = 150$ s$^{-1}$) is applied at a flow rate q of 100 cm$^3$/hour ($\gamma = 150$ s$^{-1}$), in the absence of any aldehyde compound.

The initial permeability $k_i$ to sea water in the presence of residual oil over the section BC of 370 mD is reduced by a factor of 5.6 as a result of the application of the polymer ($k_f = 66$ mD).

The initial permeability to oil in the presence of residual water over the same section BC ($k_i = 1500$ mD) is not affected by the presence of the polymer ($R_k = 1$).

The core is left to age at 120° C. for 105 days, after which alternate flows of oil and water are resume. Permeability to sea water is found to rise to 296 mD ($R_k = 1.25$), implying an absence of stability in the applied polymer. Moreover permeability to oil is affected ($k_{oil} = 1300$ mD, $R_k = 1.15$).

Hence the polymer is not necessarily stabilized in the absence of the aldehyde compound.

We claim:

1. A method of selectively reducing permeability to water as opposed to hydrocarbons in an underground formation producing at least one of oil and gas at a temperature of 70° to 130°, consisting essentially of injecting an aqueous composition through an injecting well or a producing well into said underground formation at 70°-130° C. surrounding the water injecting well or the hydrocarbon producing well, at a basic pH, said aqueous composition consisting essentially of at least one non-ionic polysaccharide at a concentration (by weight) of 180 to 5000 parts per million of solution and at least one aldehyde compound at a concentration (by weight) of 200 to 20,000 parts per million parts of solution, the aldehyde compound being different from said polysaccharide and at a higher concentration than the polysaccharide, said aqueous solution being essentially free of gel formation from a reaction between the non-ionic polysaccharide and the aldehyde compound.

2. The method of claim 1, wherein the flow rate and/or pressure is such that the shear rate is at least 50 s$^{-1}$ and the viscosity of the composition is less than 10 mPa/s.

3. The method of claim 1, wherein the polysaccharide is a glucan, a galactomannan gum or a mixture thereof.

4. The method of claim 1, wherein the polysaccharide is scleroglucan.

5. The method of claim 1, wherein the aldehyde compound is a monoaldehyde, a dialdehyde, a polyaldehyde or a combination thereof, in substituted or non-substituted form.

6. The method of claim 1, wherein the aldehyde compound is formaldehyde, glyoxal or glutaraldehyde.

7. The method of claim 1, wherein the aldehyde compound is at a concentration of 500 to 15000 ppm by weight, in the solution.

8. The method of claim 1, wherein the polysaccharide is at a concentration of 480 to 3000 ppm in the solution.

9. The method of claim 1, wherein the flow rate and/or pressure are sufficient to reduce the viscosity of the injected composition by at least 50% relative to its value at a shear rate of 1 s$^{-1}$.

10. A method of claim 1 wherein said solution is injected into a well producing oil or gas while off of production and then after the injection said well is put back on production.

11. The method of claim 1, wherein said solution is injected into a well for injecting water in a formation containing oil or gas, and thereafter water is injected into said well.

12. The method of claim 1, wherein the aqueous composition has a pH of 7.1-10.

13. The method of claim 1, wherein water in the underground formation at the injection well or producing well has a salinity of at least 30 g/l expressed in NaCl.

14. A composition consisting essentially of:
from 0.018% to 0.5% by weight of at least one non-ionic polysaccharide;
from 0.02 to 2% by weight of at least one water soluble aldehyde compound different from said polysaccharide; and
from 97.5% to 99.962% by weight of water said composition being essentially free of any gel formed from a reaction between the non-ionic polysaccharide and the aldehyde compound.

15. The composition of claim 14 consisting essentially of: from 0.048% to 0.3% of at least one non-ionic polysaccharide,
from 0.05% to 1.5% of at least one water soluble aldehyde compound different from said polysaccharide; and
from 98.2% to 99.902% of water, said composition being essentially free of any gel formed from a reaction between the non-ionic polysaccharide and the aldehyde compound.

16. Composition according to claim 14, wherein the polysaccharide is a glucane, galactomannane or mixtures thereof.

17. A composition according to claim 14, wherein the polysaccharide is scleroglucane.

18. A composition according to claim 16, wherein the aldehyde compound is a monoaldehyde, dialdehyde, a polyaldehyde or a combination thereof, in substituted or non-substituted form.

19. A composition according to claim 16, wherein the aldehyde compound is formaldehyde, glyoxal or glutaraldehyde.

20. A composition according to claim 17, wherein the aldehyde compound is formaldehyde, glyoxal or glutaraldehyde.

21. The method of claim 1, wherein the aldehyde compound is at a concentration of 1000 to 12,000 ppm.

22. The method of claim 1, wherein the aldehyde compound is at a concentration of 3000 to 10,000 ppm.

23. The method of claim 1, wherein the polysaccharide is at a concentration of 700 to 2500 ppm.

24. The method of claim 22, wherein the polysaccharide is at a concentration of 700 to 2500 ppm.

25. The method of claim 4, wherein said basic pH is 7.1–10.

26. The method of claim 1, wherein said basic pH is 7.1–8.5.

27. A process according to claim 1, wherein said aldehyde is formaldehyde.

* * * * *